United States Patent [19]
Peterson

[11] Patent Number: 5,955,675
[45] Date of Patent: Sep. 21, 1999

[54] SELF ENERGIZING PROCESS SEAL FOR PROCESS CONTROL TRANSMITTER

[75] Inventor: Thomas P. Peterson, Chanhassen, Minn.

[73] Assignee: Rosemount Inc., Eden Prairie, Minn.

[21] Appl. No.: 08/723,864

[22] Filed: Sep. 30, 1996

[51] Int. Cl.⁶ .............................. G01L 13/02; G01L 7/00
[52] U.S. Cl. .............................................. 73/706; 73/716
[58] Field of Search .................... 73/700, 715, 706, 73/716, 756, 866.5

[56] References Cited

U.S. PATENT DOCUMENTS

| | | | |
|---|---|---|---|
| 3,974,855 | 8/1976 | Webb | 137/527.4 |
| 4,005,848 | 2/1977 | Eggleston | 251/173 |
| 4,046,010 | 9/1977 | Akeley | 73/406 |
| 4,231,546 | 11/1980 | Eggleston et al. | 251/173 |
| 4,798,089 | 1/1989 | Frick et al. | 73/706 |
| 4,833,922 | 5/1989 | Frick et al. | 73/756 |
| 4,993,754 | 2/1991 | Templin, Jr. | 73/706 |
| 5,094,109 | 3/1992 | Dean et al. | 73/706 |
| 5,095,755 | 3/1992 | Peterson | 73/716 |
| 5,184,514 | 2/1993 | Cucci et al. | 73/706 |
| 5,427,358 | 6/1995 | Eggleston et al. | 251/367 |
| 5,487,527 | 1/1996 | Eggleston | 251/62 |
| 5,524,492 | 6/1996 | Frick et al. | 73/706 |

FOREIGN PATENT DOCUMENTS

| | | |
|---|---|---|
| 0 403 256 | 12/1990 | European Pat. Off. . |
| 2280026 | 11/1990 | Japan . |

*Primary Examiner*—Max H. Noori
*Attorney, Agent, or Firm*—Westman, Champlin & Kelly, P.A.

[57] ABSTRACT

A process control instrument adapted to provide an output indicative of a parameter of a process fluid is disclosed. The process control instrument is designed to be attachable to a flange having a first passageway filled with process fluid. A body of the process control instrument has an opening adjacent to the first passageway adapted to receive process fluid from the first passageway. A seal positioned in the opening and attached to the body at a seal outer diameter is adapted to prevent process fluid from leaking from the first passageway and the opening past the flange.

12 Claims, 3 Drawing Sheets

5,955,675

SELF ENERGIZING PROCESS SEAL FOR PROCESS CONTROL TRANSMITTER

BACKGROUND OF THE INVENTION

The present invention relates to a process control transmitter. In particular, it relates to a process seal for a process control transmitter.

Transmitters which sense pressure have a pressure sensor coupled to at least one isolation diaphragm. The isolation diaphragm isolates the pressure sensor from corrosive process fluids being sensed. Pressure is transferred from the isolation diaphragm to the sensor having a sensing diaphragm through a substantially incompressible isolation fluid carried in a passageway. U.S. Pat. No. 4,833,922 entitled MODULAR PRESSURE TRANSMITTER and U.S. Pat. No. 5,094,109 entitled PRESSURE TRANSMITTER WITH STRESS ISOLATION DEPRESSION show pressure transmitters of this type.

The process fluid sealing mechanism for a transmitter should be operable in a wide range of chemical environments, temperature ranges and stress conditions and work well over a broad range of pressures. Teflon® and other fluorocarbons are among the preferred sealing compounds. Hastelloy®, 316 stainless steel and other corrosion resistant materials are preferred as construction materials for wetted surfaces. While these materials have very good corrosion resistance properties, their mechanical properties, such as yield strength of the corrosion resistant alloys and the resistance to extrusion of the sealing materials, are marginal at best. Sealing material tends to extrude when subjected to high pressures and temperatures. For this reason, the sealing material must be treated as a gasket. To form effective seals with gaskets, it is usually necessary to have a sealing material with a large surface area under significant compression. The stress from compression is mechanically coupled to the isolation diaphragm and ultimately to the sensing diaphragm of the pressure transmitter. The amount of stress can vary over time as mounting bolts loosen or are re-torqued, and as the gasket sealing material extrudes. These changes result in instabilities in the pressure sensor output.

To minimize the stress coupled to the process isolation diaphragm, it is preferred to separate the diaphragm from the sealing mechanism to provide stress isolation. However, practical considerations make stress isolation of the diaphragm difficult. Industry standards and the requirement of backward compatibility with existing products dictate the size, location and pattern of the bolts and pressure ports of the assembly. The overall geometry of the transmitter limits the space that must be shared by the process sealing gaskets and the isolating diaphragms. The process isolation diaphragms must fit within the boundaries defined by the bolt pattern. Space within the bolt boundary used for sealing is generally unavailable for isolation diaphragms. It is frequently undesirable to reduce the size of the isolation diaphragms because smaller isolation diaphragms are more sensitive to stress coupling and therefore instabilities result.

Tradeoffs must typically be made among the several competing needs of the pressure transmitter design: 1) the need for large compliant diaphragms; 2) the need for diaphragms that are well isolated from the stresses of the sealing mechanism; 3) the need for a sealing mechanism that has sufficient surface area; 4) the need for a sealing mechanism held together with sufficient force to be reliable; and 5) the constraint that all structures fit within the boundary defined by the bolt pattern.

SUMMARY OF THE INVENTION

A transmitter for providing an output related to a pressure or other parameters of a process fluid is disclosed. The transmitter is attachable to a flange having a first passageway open to and adapted to receive process fluid. A body of the transmitter has an opening adjacent to the first passageway for receiving process fluid from the first passageway. A seal positioned in the opening and attached to the body at a seal outer diameter prevents process fluid from the first passageway and the opening from leaking past the flange. In some preferred embodiments, the seal has an inner diameter which is less than an outer diameter of an isolation diaphragm positioned in the opening such that the seal overlaps the isolation diaphragm without physically contacting the isolation diaphragm.

BRIEF DESCRIPTION OF THE DRAWINGS

FIG. 2 includes inset A which is a plan view of the process seal.

DETAILED DESCRIPTION OF THE PREFERRED EMBODIMENTS

Figure 1:
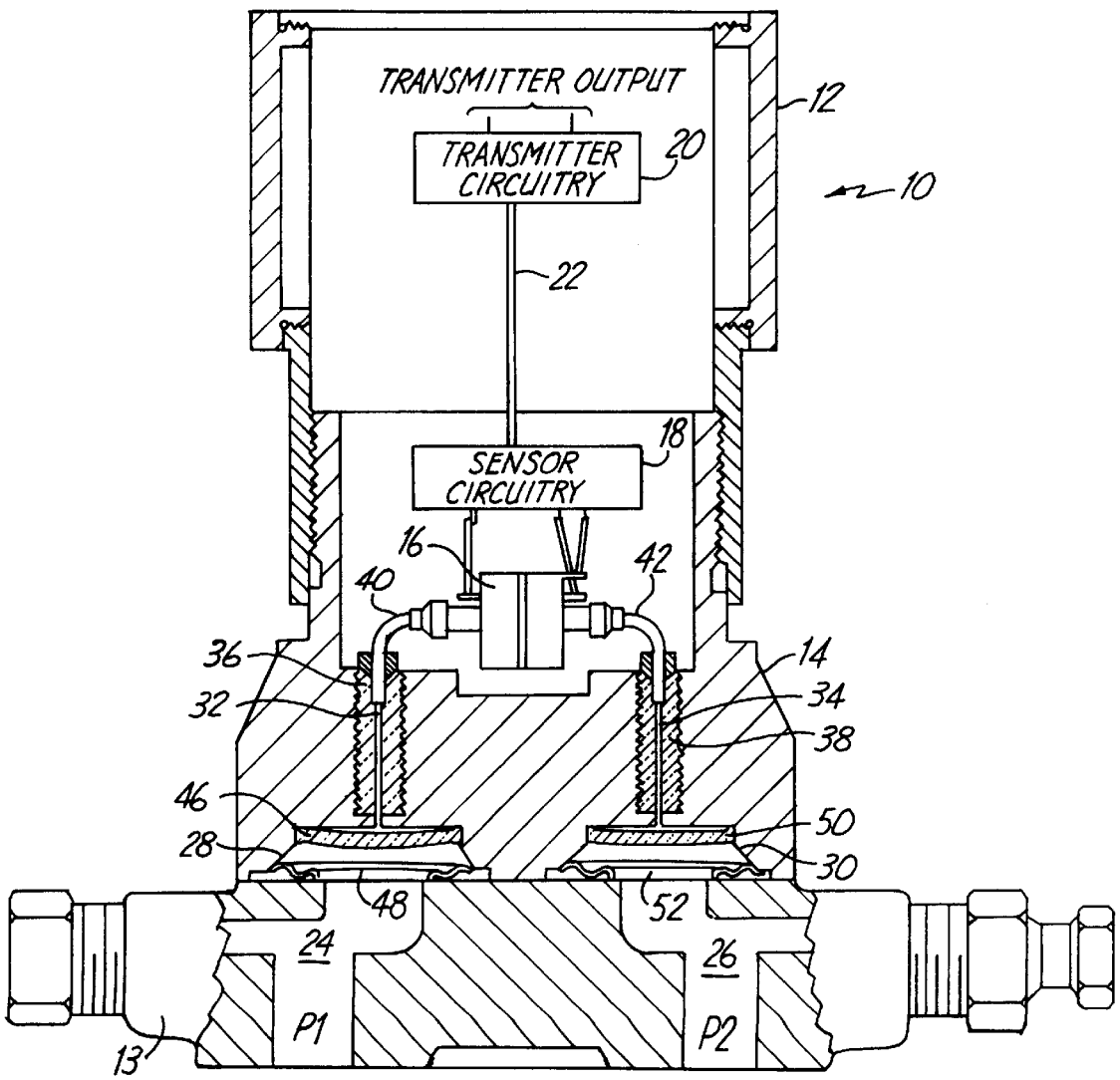
FIG. 1 is a cross-sectional fragmentary view of a pressure transmitter having a process seal in accordance with the present invention.

FIG. 1 shows pressure transmitter 10 having transmitter body 12, flange (or coplanar manifold) 13 and sensor body 14 in accordance with the present invention. Although the present invention is shown with a coplanar flange, the invention may be used with any type of flange, manifold, or other coupling adapted to receive process fluid. Sensor body 14 includes pressure sensor 16, and transmitter body 12 includes transmitter circuitry 20. Sensor circuitry 18 is coupled to transmitter circuitry 20 through communication bus 22. Transmitter circuitry 20 sends information related to pressure of the process fluid over a two wire process control loop 23 (or circuit) wholly powered over the control loop 23 by a controller 25.

Pressure sensor 16 measures a difference in pressure between pressure P1 in passageway 24 and pressure P2 in passageway 26 of flange 13. Pressure P1 is coupled to sensor 16 through passageway 32. Pressure P2 is coupled to sensor 16 through passageway 34. Passageway 32 extends through coupling 36 and tube 40. Passageway 34 extends through coupling 38 and tube 42. Passageways 32 and 34 are filled with a relatively incompressible fluid such as oil. Couplings 36 and 38 are threaded into sensor body 14 and provide a long flame-quenching path between the interior of the sensor body carrying sensor circuitry 18 and process fluid contained in passageways 24 and 26.

Passageway 24 is positioned adjacent to opening 28 in sensor body 14. Passageway 26 is positioned adjacent to opening 30 in sensor body 14. Diaphragm 46 is positioned in opening 28 and is coupled to sensor body 14 adjacent to passageway 24. Passageway 32 extends through coupling 36 and sensor body 14 to diaphragm 46. Diaphragm 50 is coupled to sensor body 14 adjacent to passageway 26. Passageway 34 extends through coupling 38 and sensor body 14 to diaphragm 50.

In operation, flange 13 presses against seals 48 and 52 when transmitter 10 is bolted to flange 13. Seal 48 is seated on sensor body 14 adjacent to opening 24 and diaphragm 46, and prevents process fluid leakage from passageway 24 and opening 28 past flange 13 to the outside environment. Seal 52 is coupled to sensor body 14 adjacent to opening 26 and diaphragm 50, and prevents process fluid leakage from passageway 26 and opening 30 past flange 13 to the outside environment. Seals 48 and 52 according to the present invention are preferably identical. Seal 48 is discussed in greater detail below with reference to FIGS. 2–6.

Seals 48 and 52 of the present invention dramatically reduce the mechanical stresses on isolation diaphragms 46 and 50 which are conventionally caused by a sealing gasket used to form a seal between flange 13 and body 14. The invention provides numerous advantages over the prior art including: 1) minimizing the force needed to provide an effective seal; 2) making the sealing force largely independent of the force provided by the tension in the bolts that couple the transmitter to a process flange; 3) using the process pressure itself to provide force for sealing at high pressures; 4) allowing larger diameter isolator diaphragms to be installed in the confined area than would otherwise be possible; and 5) relaxing the requirements that materials having excellent mechanical properties be used in manufacturing the spring so that materials having improved corrosive properties can be used.

Figure 3:
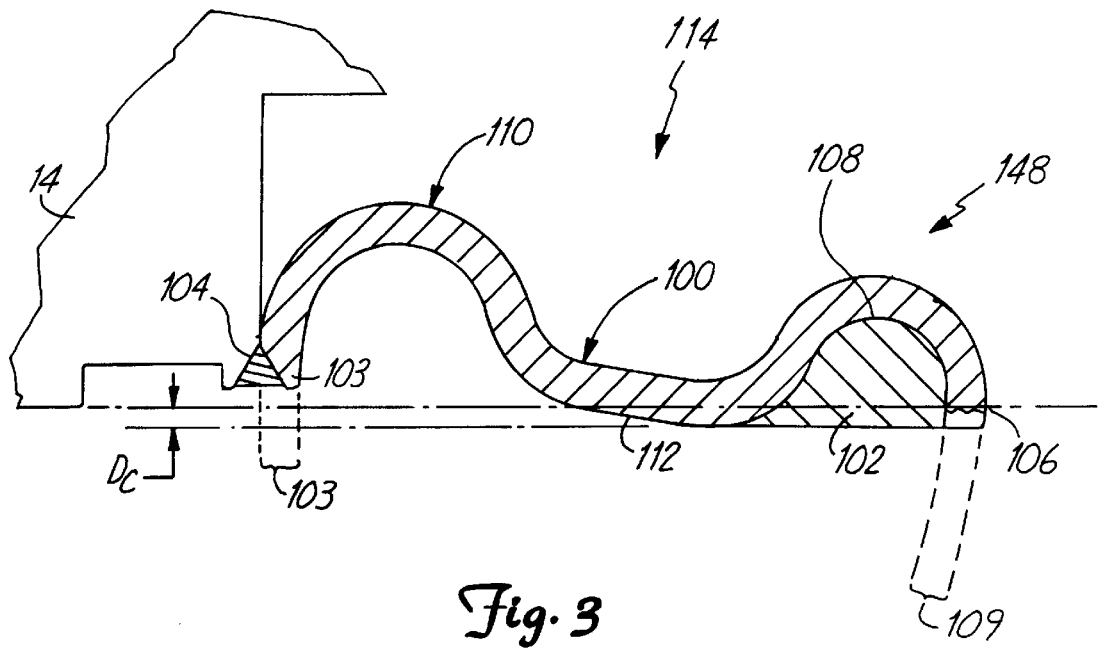
FIG. 3 is a cross-sectional view which illustrates the pressure transmitter process seal of the present invention in greater detail, without an isolator diaphragm.
Figure 2:
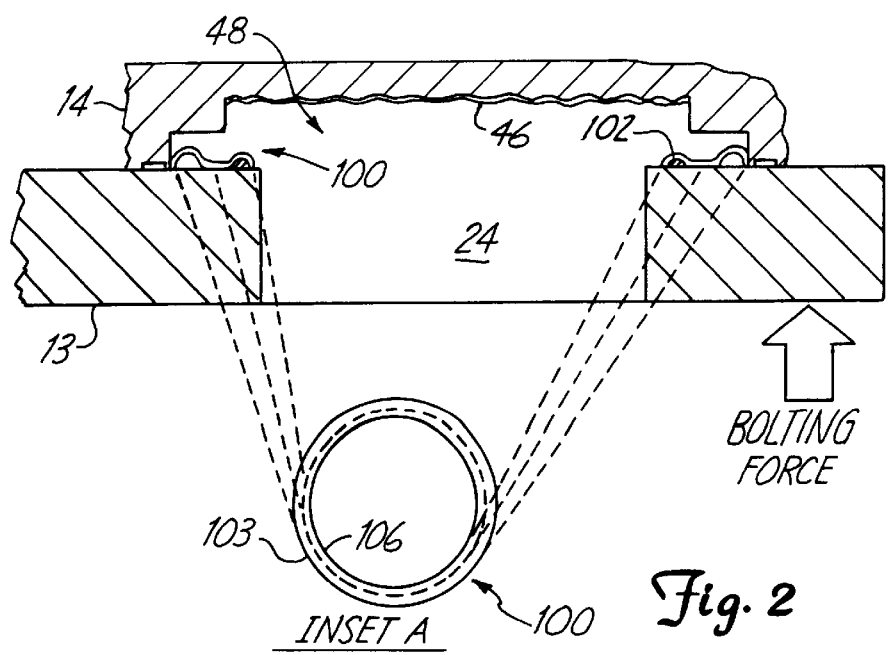
FIG. 2 is a cross-sectional view of a portion of the pressure transmitter shown in FIG. 1 which illustrates the process seal of the present invention in greater detail.

FIGS. 2 and 3 show a first preferred embodiment of seal 48 of the present invention in cross section. Seal 48 is an annulus. However, the seal could be any suitable closed-curvilinear form. FIG. 2 shows seal 48 in cross section with portions removed for illustration. Inset A is a plan view of a seal 100 better showing its annular shape. Seal 48 functions with sensor body 14 and passageway 24 to prevent process fluid from passageway 24 and opening 28 from leaking into the environment. FIG. 3 shows the specific features of seal 48 in greater detail.

Seal 48 includes shaped or stamped annular ring 100 and sealing gasket material 102. Shaped annular ring 100 is welded at outer diameter 103 to sensor body 14 using weld joint 104. Thus, seal 48 is cantilevered over isolation diaphragm 46. In preferred embodiments, ring 100 is stamped from 316 stainless steel, Hastelloy®, tantalum (Ta), Monel, or other suitable materials. Generally, it is preferred that all of the wetted surfaces be of the same material. The term "wetted surfaces" refers to surfaces on flange 13 or in transmitter 10 which are wetted by the process fluid. In order to satisfy this requirement, ring 100 is preferably fabricated from the same material as the wetted surfaces of flange 13. While ring 100 is preferably a stamped out part, in other embodiments it can be a machined or otherwise fabricated part.

Sealing material 102 is preferably a material such as glass filled Teflon®, graphite filled Teflon, Viton® or other O-ring materials known in the art. Generally, more resilient sealing materials are preferred. Weld joint 104 is preferably a butt joint weld in some embodiments. Ring 100 can be attached or coupled to sensor body 14 using attachment methods such as tungsten inert gas (TIG) welds, laser welds, electron beam welds, and plasma welds. Preferably, weld joint 14 will require no added materials so that corrosion at joint 104 is minimized.

At inner diameter 106, channel 108 is formed by the curvature of end 109 of ring 100. Channel 108 is adapted for holding the sealing or gasket material 102. Ring 100 includes bend 110, which is oriented generally upward, toward flange 13 at inner diameter 103. Middle portion 112 is angled upward such that it is closer to flange 13 near inner diameter 106 than it is near outer diameter 103. The shapes and orientations of bend 110, middle portion 112 and end portion 109 are such that, when flange 13 and the transmitter are connected, ring 100 will be forced into compression and will bend slightly so that end 109 is compressed against diaphragm 46 (not shown in FIG. 3). The overall shape of ring 100 and the angle of middle portion 112 provides compression range or distance $D_C$. Compression range $D_C$ is at a minimum, a distance sufficient to provide ring 100 with sufficient spring board action such that seal 48 provides adequate sealing at low pressures, while still being able to withstand up to 4,500 PSI pressure. In other words, this configuration provides enough force to compress material 102 sufficiently to make a seal at low process pressures and even under vacuum (e.g., 0 PSIA) conditions. As the process pressure rises, the process fluid applies force to back side 114 of the ring (i.e., it forces ring 100 further toward flange 13) and increases the compression of the seal. If the compliance of the ring is adequate, force in excess of that needed for sealing will always be available. The amount of force needed varies somewhat with different sealing materials.

Ring 100 is shaped in such a manner that middle portion 112 will flatten out against flange 13 at very high pressures. This feature prevents ring 100 from being permanently deformed at high pressures. The high curvature of ring 100 at inner and outer diameters 103 and 106 sufficiently strengthens these portions against the flattening forces of process pressure. The cantilevered structure of sealing ring 100 allows a larger diameter diaphragm to be installed prior to welding the sealing ring in place. Since seal 48 does not utilize the clamping or fastening forces provided by the bolts (not shown), inner diameter 106 of ring 100 can be less than the outer diameter of diaphragm 46 so that seal 48 and diaphragm 46 actually overlap.

The non-flat (i.e. ridged) shape of sealing ring 100 increases the ease with which sealant material 102 can be replaced in the field. Further, the features of ring 100 which allow it to flatten under the force of high process pressures, increases the longevity of ring 100. The length of ring 100 (i.e., the distance between inner diameter 103 and outer diameter 106) is preferably as large as possible in order to improve the performance of the seal. A long spring board (i.e., ring 100) helps to accommodate manufacturing tolerance build-ups and changes in the shape of seal material 102 over time. It also spreads the mechanical stresses over a wider area thereby making ring 100 last longer. The maximum diameter of ring 100 is tightly controlled because of the space and design limitations of pressure transmitters. The maximum outer diameter of ring 100 (and thus of seal 48) is set by the industry standard bolt pattern. The interior diameter is controlled by the size of the bolts used and by the size of opening 24 through which the pressurized process fluid enters, which is also set by an industry convention.

Figure 4:
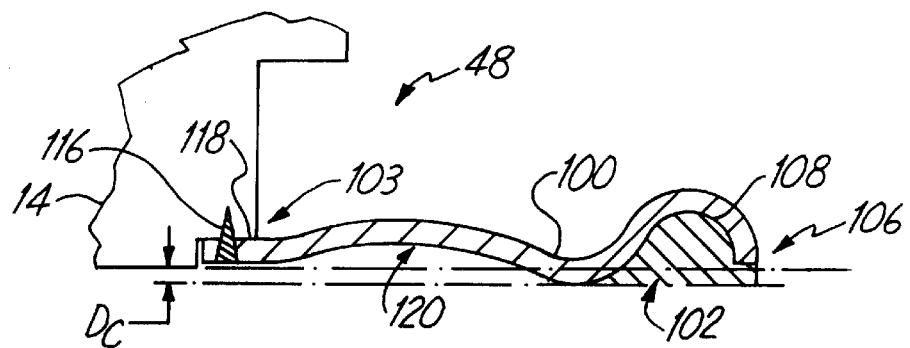
FIG. 4 is a cross-sectional view of a portion of a pressure transmitter which illustrates an alternative embodiment of the process seal of the present invention.

As discussed above, sealing ring 100 is preferably held in place with butt joint weld 104. However, a penetration joint 116 formed by laser or electron-beam welding is shown in FIG. 4. FIG. 4 also shows an alternative configuration for seal 48. In the embodiment shown in FIG. 4, ring 100 overlaps and is parallel to slot region 118 of sensor body 14 in which penetration joint 116 is located. Ring 100 fits in slot region 118. Further, while the embodiment of seal 48 shown in FIG. 4 includes channel 108 formed in ring 100, bend 110 and angled middle portion 112 (both shown in FIG. 3) are replaced with curved portion 120 which has a significantly lesser degree of curvature than bend 110. However, like the previous embodiment, curved portion 120 provides compression force for compressing material 102 against flange 13. Also, portion 120 can be compressed by distance $D_c$. under high pressure to increase the durability of the seal. Channel 108 in ring 100 is suitable for either a gasket type material such as Teflon®, or for an elastomeric o-ring material such as fluorocarbon or Nitrile.

Figure 5:
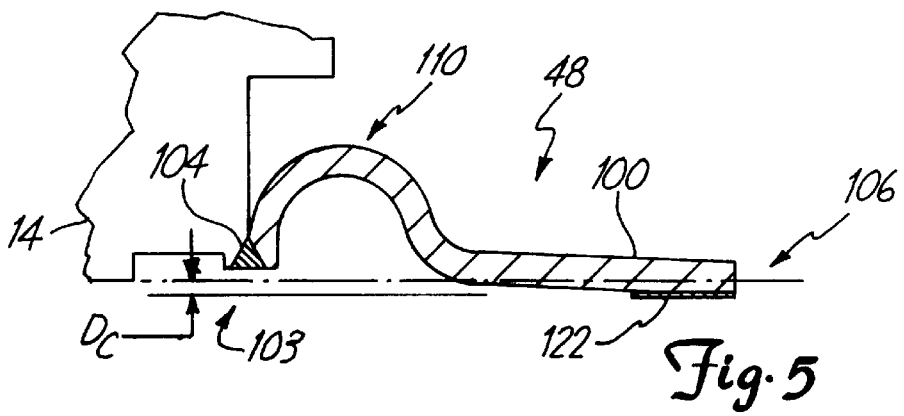
FIG. 5 is a cross-sectional view of a portion of a pressure transmitter which illustrates an alternative embodiment of the process seal of the present invention.

A pre-coated or thin-coat gasket design is illustrated in FIG. 5. The configuration of seal 48 shown in FIG. 5 includes bend 110 like that shown in FIG. 3, but does not include channel 108 formed in ring 100. Instead, beyond bend 110, ring 100 is substantially flat and slightly angled toward the flange at inner diameter 106. Pre-coated or thin coat seal or gasket material 122 is attached to ring 100 at inner diameter 106 for forming a seal against a surface of flange 13.

Figure 6:
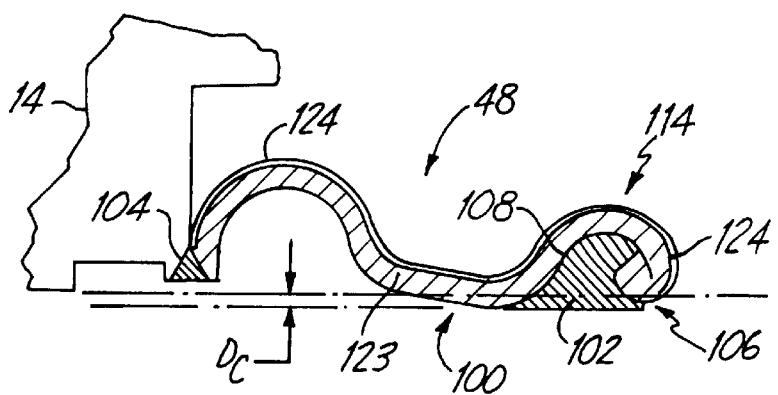
FIG. 6 is a cross-sectional view of a portion of a pressure transmitter which illustrates an alternative embodiment of the process seal of the present invention.

If better spring properties are needed for a high deflection design or high pressure design, ring 100 can be fabricated from a clad material having layer 123 of material with good spring properties and layer 124 of corrosion resistant material. Corrosion resistant layer 124 is attached to layer 123 so that the corrosion resistant material is exposed to the process fluid as shown in FIG. 6. In FIG. 6, ring 100 has a shape similar to that shown in FIG. 3, but includes material layer 123 having improved spring properties, but less corrosion resistance. Corrosion resistant clad material 124 is bonded to layer 123 along back side 114. Clad material 124 is folded over inner diameter 106 to prevent the process fluid from coming into contact with the cladding interface.

Although the present invention has been described with reference to preferred embodiments, workers skilled in the art will recognize that changes may be made in form and detail without departing from the spirit and scope of the invention. For example, while the seal of the present invention has been described generally with, reference to pressure transmitters, it can be used with any process control instrument which is coupled to the process. Other process control instruments which can use the seal of the present invention include temperature sensors and transmitters, pressure sensors and transmitters, differential pressure sensors and transmitters, absolute pressure sensors and transmitters, gauge pressure sensors and transmitters, flow sensors and transmitters, and pH sensors and transmitters, to name just a few. Further, while preferred embodiments of the process seal of the present invention have been shown to include an annular ring having curved portions for holding a sealing material and/or for increasing the durability of the seal, any of a wide variety of cantilevered annular ring shapes can be used. Further, while the seal of the present invention has been described as an annular sealing mechanism, in other embodiments the seal of the present invention can be a non-annular seal. Also, while the present invention is described primarily as being connected at its outer diameter to the body of the process control instrument, in other possible embodiments, the seal of the present invention can be connected at its inner diameter to the process control instrument.

The present invention provides numerous advantages over the prior art. Using the seal of the present invention, the externally applied forces needed to provide an effective seal are minimized or eliminated. Thus, the sealing force is largely independent of the force provided by the tension in the bolts that couple the process control instrument to a process flange. Further, the present invention uses the process pressure itself to provide force for sealing at high pressures. Thus, as process fluid pressure increases, the sealing capabilities of the seal of the present invention increase simultaneously. Also, the cantilevered design of the present invention makes it possible to use larger diameter isolation diaphragms. Further, the seal of the present invention allows the requirements that the seal material have excellent mechanical properties to be relaxed so that materials having improved corrosive resistance can be used instead. The invention is not limited to the particular flange/body seal disclosed herein. Further, "flange" means any coupling which a field device may couple to in order to receive process fluid.

What is claimed is:

1. A process control instrument for coupling to a process, the process control instrument being attachable to a flange having a first passageway adapted to be filled with process fluid, the process control instrument comprising:

a body having an opening adjacent to the first passageway for receiving process fluid from the first passageway when the process control instrument is attached to the flange; and a seal adapted to be positionable against the flange for preventing process fluid from leaking past the flange, wherein the seal comprises:

a ring positioned in the opening and connected at its outer diameter to the body, wherein the ring has a middle portion between its inner diameter and its outer diameter, wherein the middle portion is angled relative to a surface of the flange such that high process pressures flatten the middle portion directly against the surface of the flange to thereby prevent the ring from being permanently deformed by the high process pressures; and sealing material coupled to the ring near its inner diameter, wherein the ring is adapted to force the sealing material into contact with the flange to prevent process fluid from leaking from the first passageway and from the opening past the flange.

2. The process control instrument of claim 1, wherein the ring forms a channel near its inner diameter, and wherein the sealing material is positioned in the channel.

3. A transmitter for providing an output indicative of a pressure of a process fluid, the transmitter being attachable to a flange having a first passageway adapted to be filled with process fluid, the transmitter comprising:

a body having an opening adjacent to the first passageway adapted to receive process fluid from the first passageway when the transmitter is attached to the flange, the body also having a second passageway filled with a first fluid and extending from a location adjacent the opening to a sensing means for providing a pressure related output;

an isolation diaphragm positioned in the opening of the body and separating the opening and the first passageway from the second passageway and thereby adapted to prevent process fluid from entering the first passageway; and a seal positioned in the opening preventing process fluid from leaking from the first passageway and the opening past the flange, wherein the seal comprises:

sealing material adapted to be forced into contact with the flange; and a ring member positioned in the opening and forcing the sealing material into contact with the flange, wherein the sealing material is positioned in a channel formed by the ring member near a ring member inner diameter, the ring member being connected to the body at a ring member outer diameter, wherein the ring member inner diameter is less than the isolation diaphragm outer diameter such that the ring member overlaps the isolation diaphragm in the opening without physically contacting the isolation diaphragm, and wherein the ring member has a middle portion between the channel and the ring member outer diameter which is angled relative to a surface of the flange such that high process pressures flatten the middle portion directly against the surface of the flange to thereby prevent the ring member from being permanently deformed by the high process pressures.

4. The process control instrument of claim 1, wherein the ring is shaped such that the flange deflects the ring to thereby force the ring into compression.

5. The process control instrument of claim 4, wherein the ring is shaped such that the compression of the ring compresses the sealing material against the flange sufficiently so that process fluid leakage is prevented at substantially 0 PSIA process fluid pressure.

6. The process control instrument of claim 5, wherein the ring is shaped such that the pressure of the process fluid applies a force to the ring to thereby increase the compression of the sealing material against the flange such that compression of the sealing material is increased as the pressure of the process fluid increases.

7. The process control instrument of claim 1, wherein the ring includes a first layer of material having desirable spring properties and a second layer of material having desirable corrosive resistant properties, wherein the ring is shaped at its inner diameter such that the first layer of material does not come into contact with the process fluid.

8. The process control instrument of claim 1, wherein the body further comprises a second passageway filled with a first fluid and extending from a location adjacent the opening to a sensing means for providing a pressure related output, and wherein the process control instrument further comprises an isolation diaphragm positioned in the opening of the body and separating the opening and the first passageway from the second passageway and for preventing process fluid from entering the first passageway.

9. The process control instrument of claim 8, wherein the inner diameter of the ring is less than an outer diameter of the isolation diaphragm such that the ring overlaps but does not physically contact the isolation diaphragm.

10. The process control instrument of claim 1, wherein the process control instrument is a transmitter adapted for providing an output related to a parameter of the process fluid, the parameter selected from the group consisting of pressure, differential pressure, temperature, flow and pH.

11. The transmitter of claim 3, wherein the ring member is shaped such that the compression of the ring member compresses the sealing material against the flange with sufficient force so that process fluid leakage is prevented at substantially 0 PSIA process fluid pressure and vacuum process conditions.

12. The transmitter of claim 11, wherein the ring member is shaped such that the pressure of the process fluid applies a force to the ring member to thereby increase the compression of the sealing material against the flange such that compression of the sealing material is increased as the pressure of the process fluid increases.

\* \* \* \* \*